United States Patent [19]

Kaufmann

[11] Patent Number: 4,540,870
[45] Date of Patent: Sep. 10, 1985

[54] MACHINE FOR ELECTRIC ARC WELDING AND AIR CARBON ARC GOUGING ON VERTICAL CURVED OR STRAIGHT WALLS

[75] Inventor: William A. Kaufmann, West Allis, Wis.

[73] Assignee: Teledyne Industries, Inc., York, Pa.

[21] Appl. No.: 616,805

[22] Filed: Jun. 4, 1984

[51] Int. Cl.³ .............................................. B23K 9/12
[52] U.S. Cl. .............................. 219/126; 219/124.21; 219/124.22; 219/125.1; 228/45
[58] Field of Search ................ 219/126, 125.1, 125.11, 219/124.22, 124.21, 69 R; 228/45

[56] References Cited

U.S. PATENT DOCUMENTS

| | | | |
|---|---|---|---|
| 2,749,421 | 6/1956 | Mikulak et al. | 219/124.22 |
| 3,658,232 | 4/1972 | Dill | 219/124.22 |
| 4,131,783 | 12/1978 | Kensrue et al. | 219/126 |

*Primary Examiner*—Clifford C. Shaw
*Attorney, Agent, or Firm*—Shoemaker and Mattare, Ltd.

[57] ABSTRACT

A portable machine for electric arc welding and air carbon arc gouging on vertical wall surfaces is disclosed. A table-mounted carriage arm carrying a vertical positioning assembly for welding nozzles or a gouging torch is driven horizontally around a vertical axis of rotation while guide wheels on the carriage arm traverse the wall surface or traverse a flexible guide secured to the machine table through a system of support arms when a rough wall surface is involved. The carriage arm is biased yieldingly toward the wall surface during its horizontal traverse and the vertical positioning assembly adjusts itself automatically on its vertical axis to maintain proper welding nozzle and gouging torch alignment with the wall surface undergoing repair. A constant speed of movement of welding nozzles or a gouging torch across the wall surface is maintained. The welding nozzles or gouging torch are motor-driven vertically on the positioning assembly.

20 Claims, 12 Drawing Figures

MACHINE FOR ELECTRIC ARC WELDING AND AIR CARBON ARC GOUGING ON VERTICAL CURVED OR STRAIGHT WALLS

BACKGROUND OF THE INVENTION

An objective of the present invention is to satisfy a need for a practical and efficient machine for reconditioning the vertical walls of paper pulp digesters in situ, such digesters ranging in size from eight and one-half to twenty-four feet in diameter and from thirty to more than two hundred feet in height. The vertical walls of digesters periodically require repair by weld deposition, and air carbon arc gouging may be required in preparation for repair by welding. While the invention is ideally suited for the above usage, it also finds utility in many other similar applications for the repair of interior and exterior surfaces of curved and flat vertical walls.

In accordance with the invention, the required digester side wall reconditioning operations are carried out by a portable table-mounted machine which can be placed at a required location inside of a massive digester and locked in place. The machine is operated by state-of-the-art controls, systematically causing electric arc welding nozzles or an air carbon arc torch to traverse the cylindrical side wall of a digester horizontally, while automatically maintaining proper welding nozzle or gouging torch alignment with the digester side wall, and also maintaining a constant speed of traverse of the welding nozzles or gouging torch across the vertical side wall. The machine aso has means to drive welding nozzles and a gouging torch upwardly or downwardly vertically on a positioning assembly carried by the horizontally swingable carriage arm of the machine. Welding material from a supply source on the carriage arm is delivered by a drive assembly also on the carriage arm to the adjustable welding nozzle or nozzles.

The reconditioning machine embodying the present invention obviates the need for mounting the machine on or attaching it to the vertical wall undergoing repair in accordance with some prior art practice. The difficulty of such practice resides in the time and labor required to mount and align the system, and if welded to the vertical wall, the additional time and labor required to remove the machine and repair the mounting areas.

The machine in accordance with the present invention is self-standing and securely lockable in the position of use. It rests on a stable platform within the digester and the vertical axis center of rotation of the machine carriage arm need not coincide with the center of the digester. When required, the machine can also be supported at the proper elevation to repair the exterior of the side wall of a digester or for a similar application.

Other features and advantages of the invention will become apparent to those skilled in the art during the course of the following description.

BRIEF DESCRIPTION OF THE DRAWINGS

FIG. 1 is a perspective view of a welding and/or gouging machine according to the invention particularly for reconditioning paper pulp digesters and the like.

DETAILED DESCRIPTION

Figure 1:
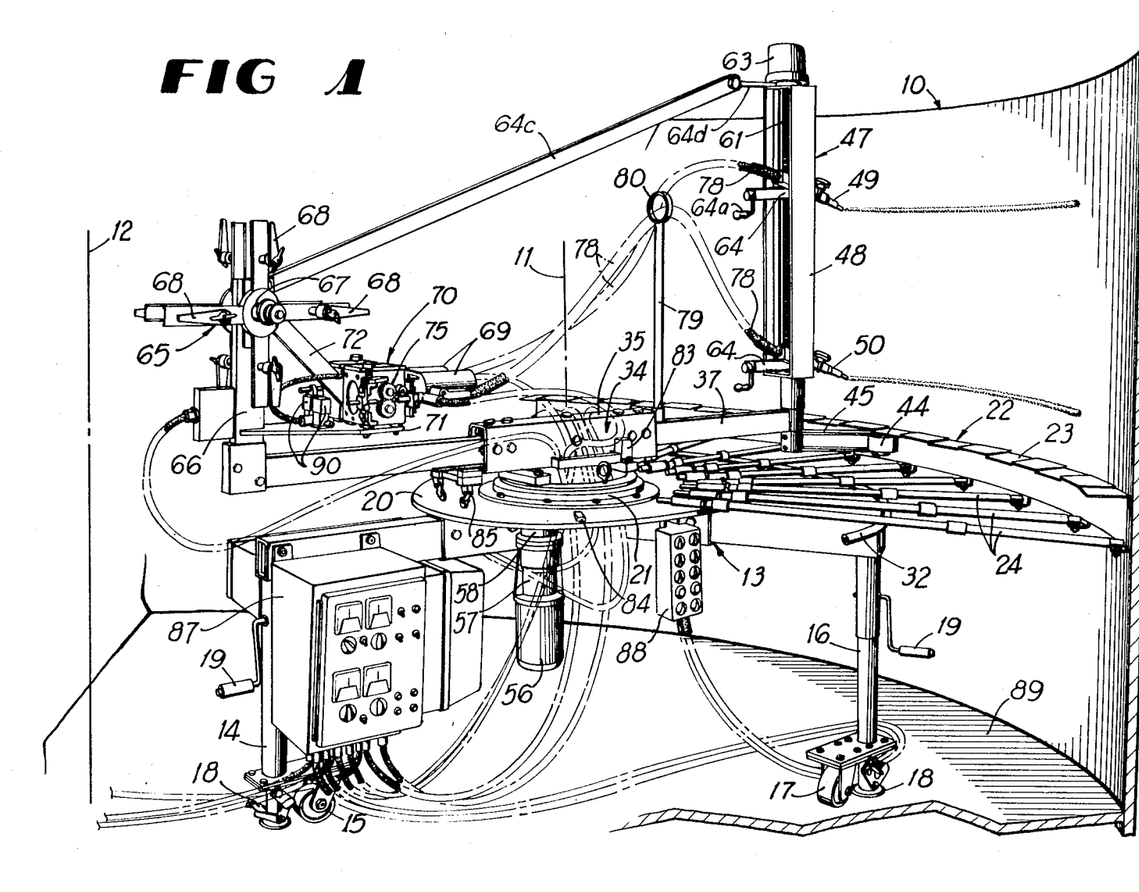
Figure 2:
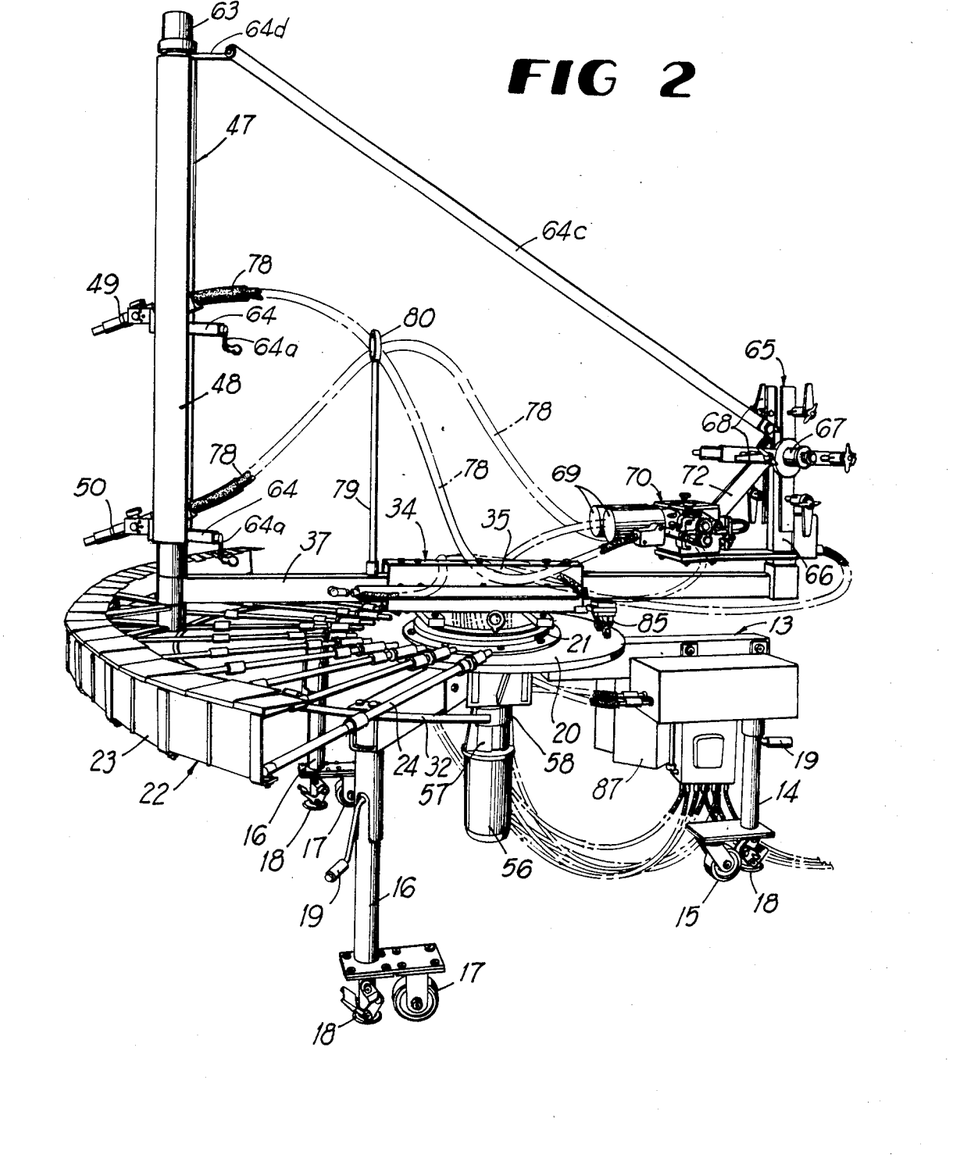
FIG. 2 is a perspective view of the machine from the opposite side to that depicted in FIG. 1.
Figure 3:
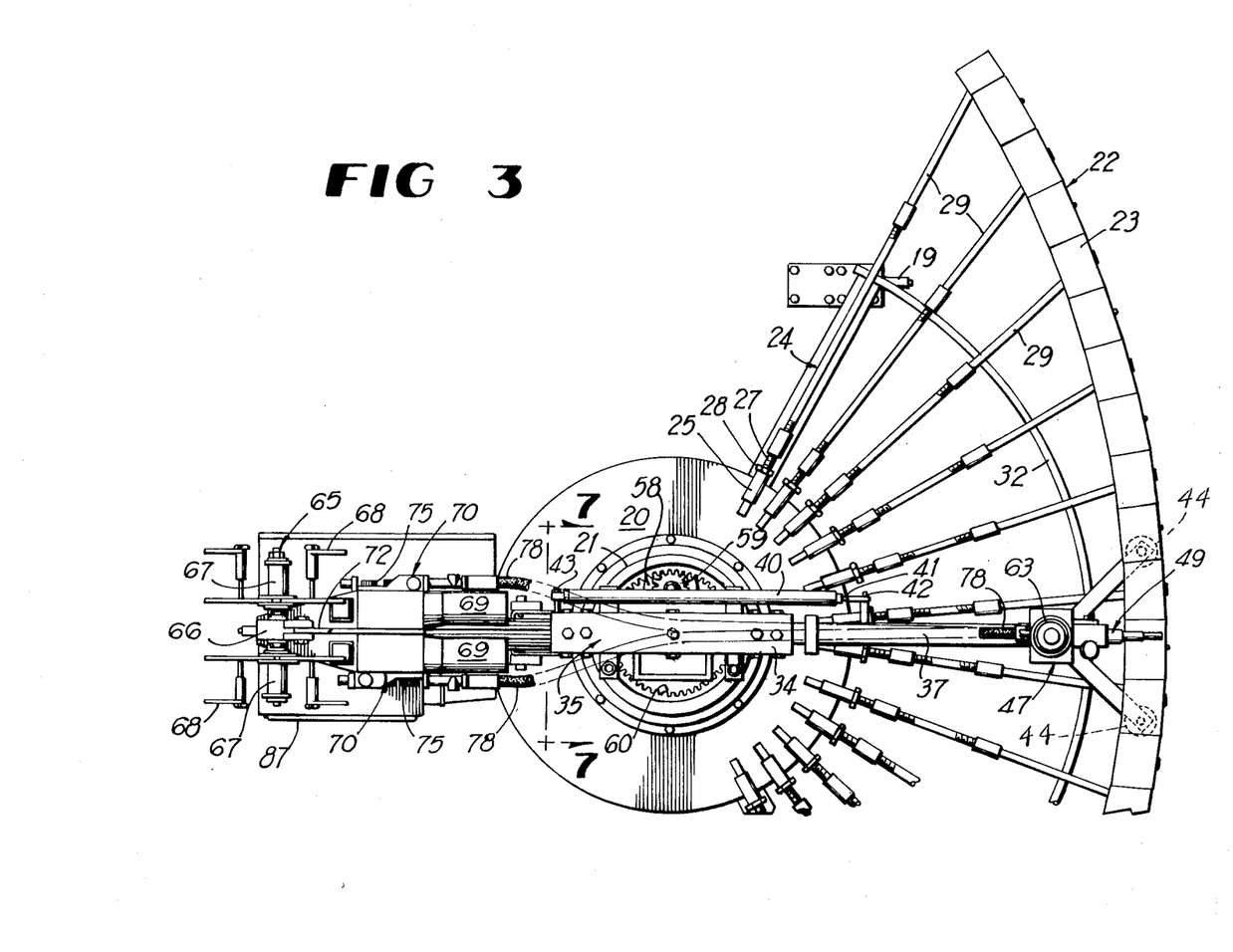
FIG. 3 is a fragmentary plan view of the machine.
Figure 4:
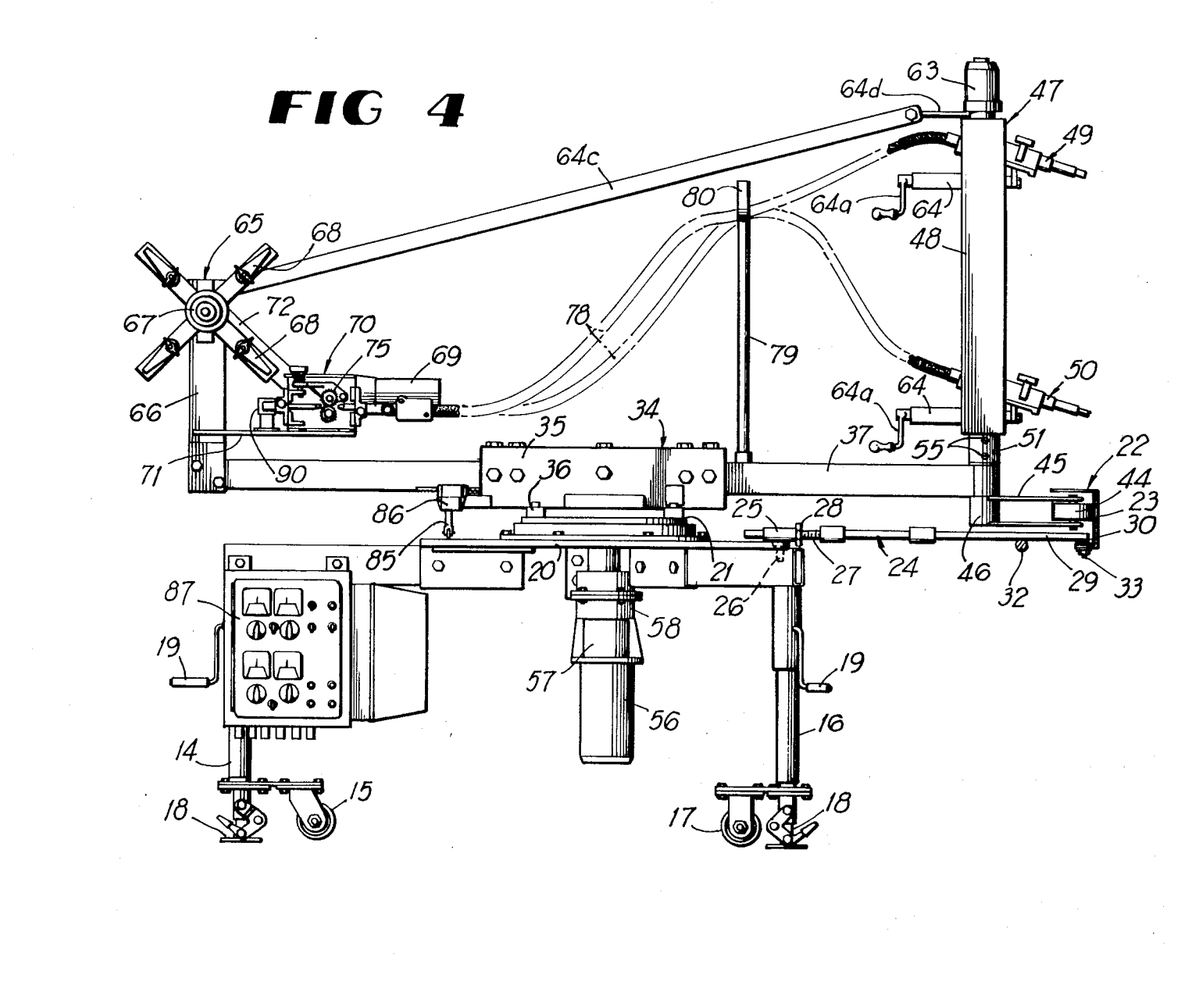
FIG. 4 is a side elevation of the machine.

Referring to the drawings in detail wherein like numerals designate like parts, a welding machine according to the invention particularly for reconditioning paper pulp mill digesters 10 is shown in its entirety in FIGS. 1, 2 and 4 of the drawings. As stated previously, the digester 10 is cylindrical and may vary in diameter from eight and one-half feet to twenty-four feet. The height of a digester can be in the range of thirty feet to more than two hundred feet. At infrequent intervals, the digester 10 requires reconditioning of its vertical side wall by the deposition of welding metal thereon. In some, but not all, instances, air carbon arc gouging is required to prepare the vertical wall for welding. The machine according to the present invention can carry out both of these operations.

The machine comprises a table assembly 13 including a single rear leg 14 having a swivel caster 15, and two forward legs 16 having rigid casters 17. Each leg of the table assembly includes a floor lock 18 and the table assembly can be leveled by the use of hand cranks 19 on its three legs. The machine has a vertical axis of rotation 11 about which a main carriage arm, yet to be described, revolves. This vertical axis in most cases does not and need not coincide with the vertical center axis 12 of the cylindrical digester 10. The table assembly 13 includes a horizontal table plate 20 secured to the legs 14 and 16 and carrying a vertical axis bearing 21, FIG. 6, of relatively large diameter.

Associated with the table assembly 13 is an arcuate guide assembly 22. This guide assembly comprises a flexible guide or track 23 which can conform to the curvature of the digester side wall which is approximately cylindrical. The guide 23 is supported by eleven horizontal radiating arms 24 having inner end anchors 25, carrying depending studs 26, received by apertures in the table plate 20, FIG. 4. Each arm 24 has a threaded length adjusting section 27, locked by a jam nut 28, and an arm end 29 carrying a swivel 30 within its outer end, secured by a set screw 31, FIG. 5. An arcuate support bar 32, resting on the two front legs 16, underlies and supports all of the arms 24 between their ends. The swivels 30 of arms 24 carry depending studs 33 which engage through apertures provided in the bottom flange of the flexible guide 23, FIG. 5. By means of the adjustable support arms 24, the flexible guide 23 is held in precision conformity with the interior surface of the side wall of digester 10.

The flexible guide 23 is employed when the digester side wall is in a rough or uneven state. When the wall is sufficiently smooth, the flexible guide can be omitted from the machine during the wall reconditioning process, as will be further discussed.

Figure 6:
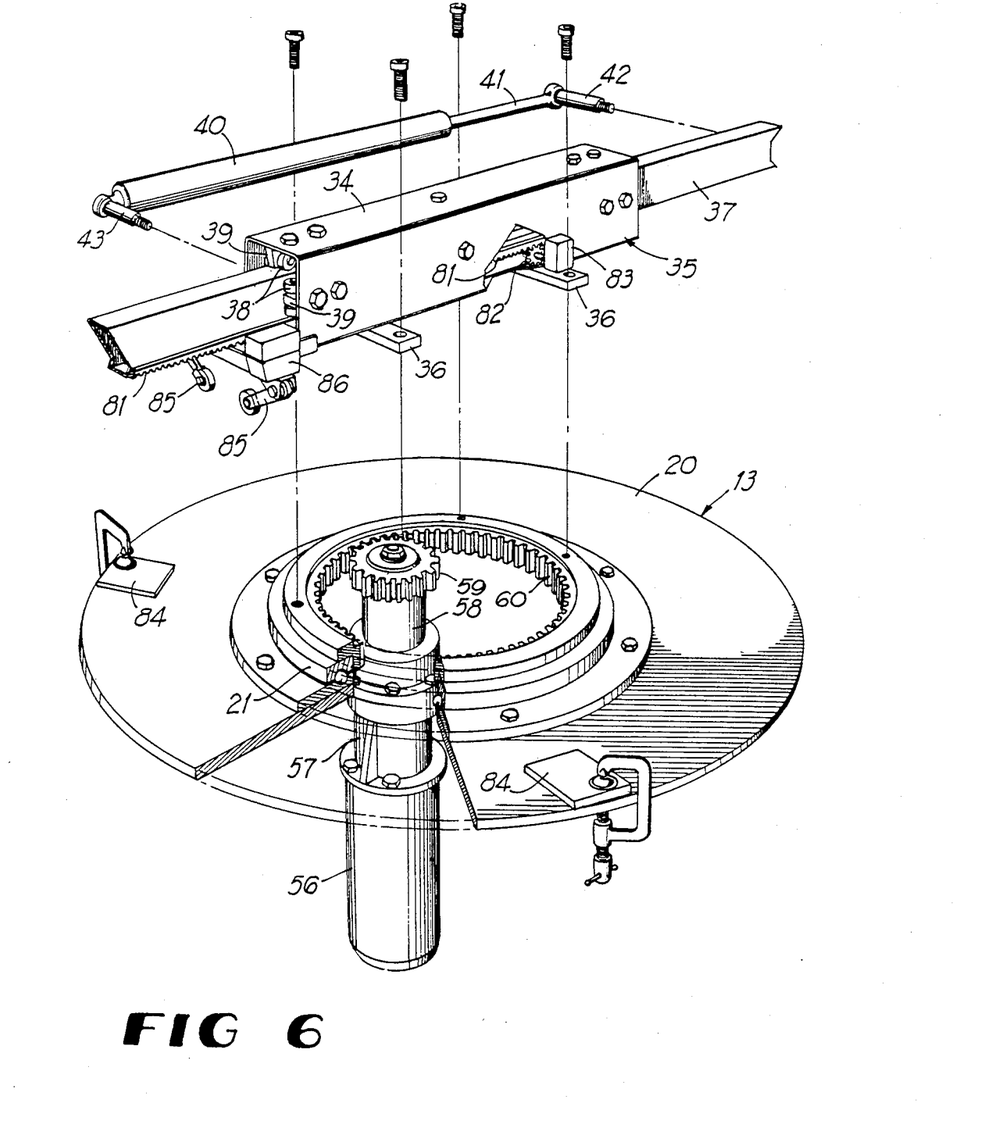
FIG. 6 is an exploded perspective view of the machine showing in particular a rotational drive for a carriage arm assembly and associated parts.
Figure 7:
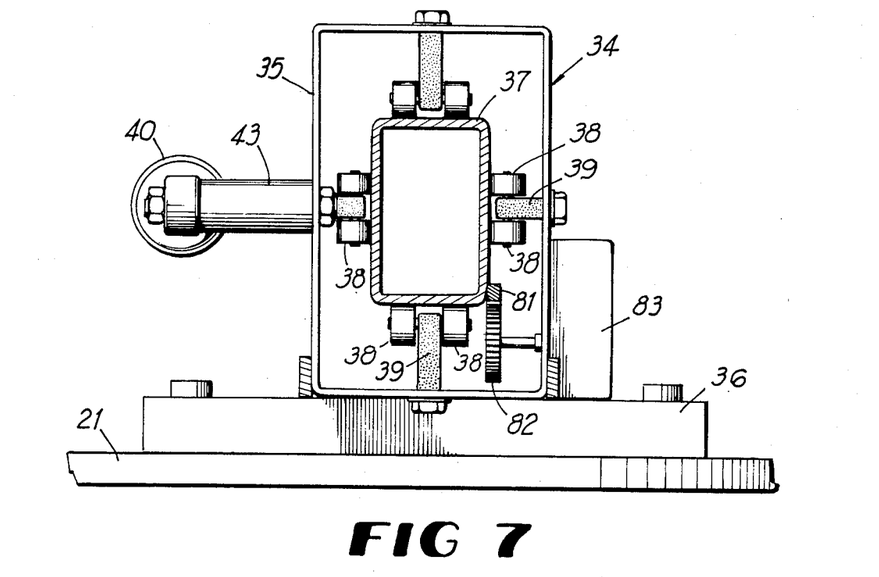
FIG. 7 is an enlarged fragmentary transverse vertical section taken through the carriage arm assembly.
Figure 8:
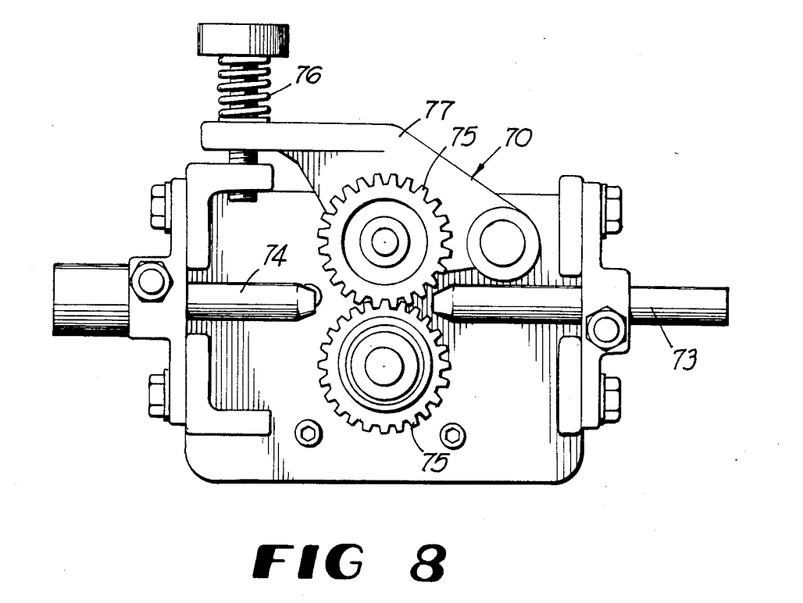
FIG. 8 is a side elevation of a welding wire drive assembly.
Figure 9:
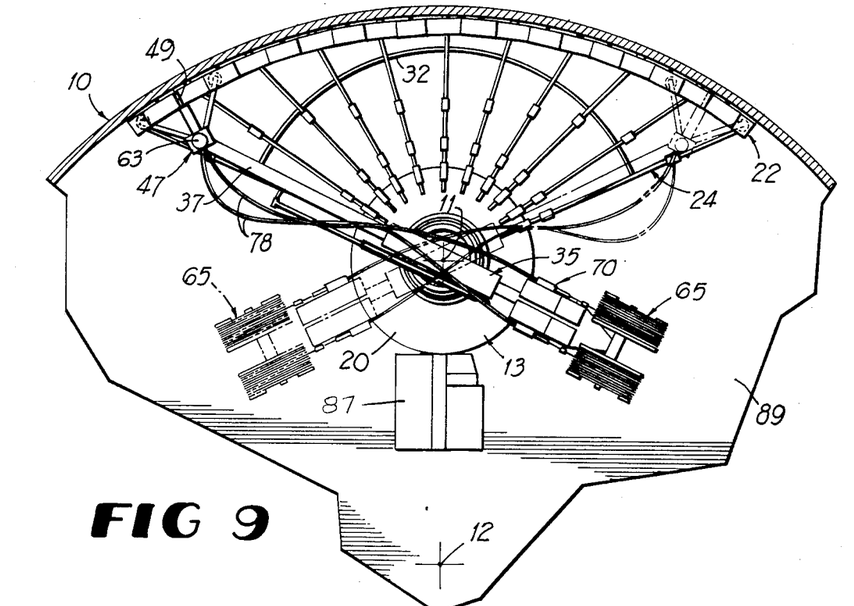
FIG. 9 is a plan view of the machine depicting the range of its effective movement across the wall of a digester.
Figure 10:
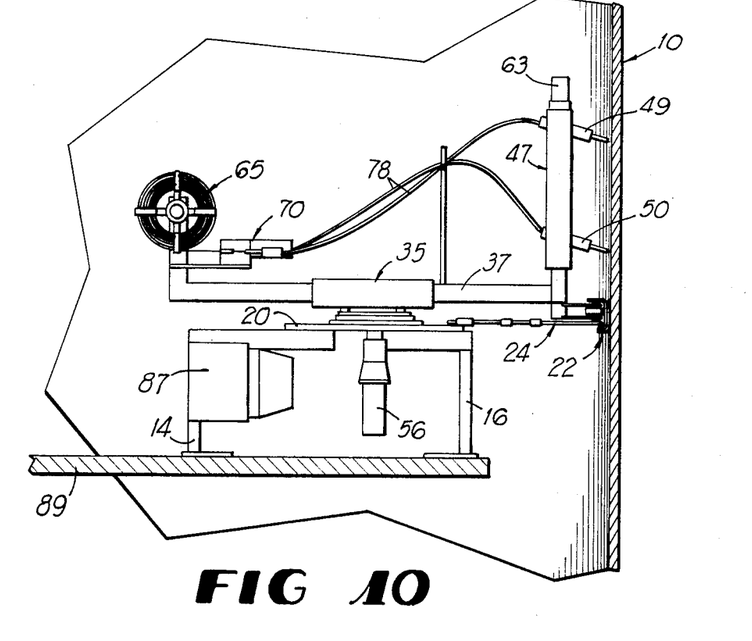
FIG. 10 is a side elevation of the machine positioned on an elevated platform.

The machine further comprises a horizontally swingable carriage arm assembly 34 which revolves around the vertical axis of rotation 11. This assembly comprises a carriage box 35 in the form of an open-ended rectangular tube, FIG. 6, attached through bottom mounting bars 36 to the rotary bearing 21 of table assembly 13. A carriage arm 37 is supported for longitudinal movement within the carriage box 35 by a system of sixteen cam rollers 38 in two groups of eight rollers each near the opposite ends of the carriage box 35. These sixteen cam rollers are adjustably held on bearing supports 39, secured to the walls of the rectangular carriage box, as shown in FIGS. 6 and 7. The carriage arm 37 is moved longitudinally forwardly and rearwardly relative to the box 35 by a pneumatic cylinder 40 near one side of the box, having its rod 41 connected with a pin 42, fixed to the arm 37 near its forward end, and having the rear end of its cylinder body connected with a similar pin 43, fixed to the rear of the carriage box 35.

At its forward end, the carriage arm 37 mounts a pair of laterally spaced vertical axis guide wheels 44, journaled on divergent support arms 45, secured to a pivot boss 46 below the forward end of the arm 37. The wheels 44 are held in firm contact with the interior of the flexible guide 23, when the guide is employed, as dictated by the degree of roughness of the vertical wall requiring repair. This firm contact is obtained by maintaining some pressure in the pneumatic cylinder 40, sufficient to extend the carriage arm 37 toward the digester side wall but insufficient to resist retraction of the arm 37 with the wheels 44 when irregularities in the digester side wall are encountered. As explained previously, when the wall is relatively smooth, the guide 23 is not required, and the wheels 44 may engage the digester side wall directly during the operation of the machine. In such cases, the guide 23 and its support arm system can be removed from the machine.

At its forward end, the horizontal carriage arm 37 supports a vertical welding nozzle and gouging torch positioning assembly 47, comprising a housing 48 having spaced side walls between which upper and lower welding nozzle support units 49 and 50 can travel vertically. At its bottom, the housing 48 carries a sleeve 51, which fits over an upstanding shaft 52, supported on a thrust bearing 53 atop the carriage arm 37. The pivot boss 46 is connected to the shaft 52 and turns therewith, bearings 54 for this rotational assembly being provided on the forward end of carriage arm 37, FIG. 5. The sleeve 51 is secured to the rotary shaft 52 by bolts having nuts thereon, these bolts penetrating the sleeve and shaft.

In accordance with a feature of the invention, as the guide wheels 44 traverse the guide 23 or the digester wall, as the case may be, and the carriage arm 37 moves longitudinally to maintain the wheels 44 in firm contact with the guide or wall, the pivot boss 46, shaft 52, and assembly 47 rotate as a unit on the vertical axis of the shaft 52, to maintain the welding nozzle units 49 and 50 in proper radial alignment with the vertical wall of digester 10.

Horizontal rotation on the vertical axis 11 is imparted to the carriage arm assembly 34 by an electric drive motor 56, depending off-center from the table assembly 13, and connected through a coupling 57 and speed reducer 58 with a vertical axis drive gear 59 near the elevation of table bearing 21, FIG. 6. The gear 59, by engaging a ring gear 60, imparts rotation to the bearing 21 on which the carriage arm assembly 34 is mounted through the bars 36, as previously described.

Within the vertical housing 48 of assembly 47 is a vertical drive screw 61 driven through a shaft coupling 62 by an electric motor 63 disposed at the top of the assembly 47. Nozzle adjusters 64 for the two nozzle units 49 and 50 are threadedly engaged with the vertical drive screw 61 to be driven upwardly and downwardly thereby as need dictates. The adjusters 64 are also slidably engaged with two vertical guide rods 64' which stabilize them. The nozzle adjusters have small hand cranks 64a which allow for easy finite adjustments of the welding nozzles in or out during operation. Typically, the two nozzle units 49 and 50 are spaced apart vertically about twenty-four inches. The units 49 and 50 are also angularly adjustable upwardly and downwardly and lockable on the adjusters 64 at required angles.

Figure 5:
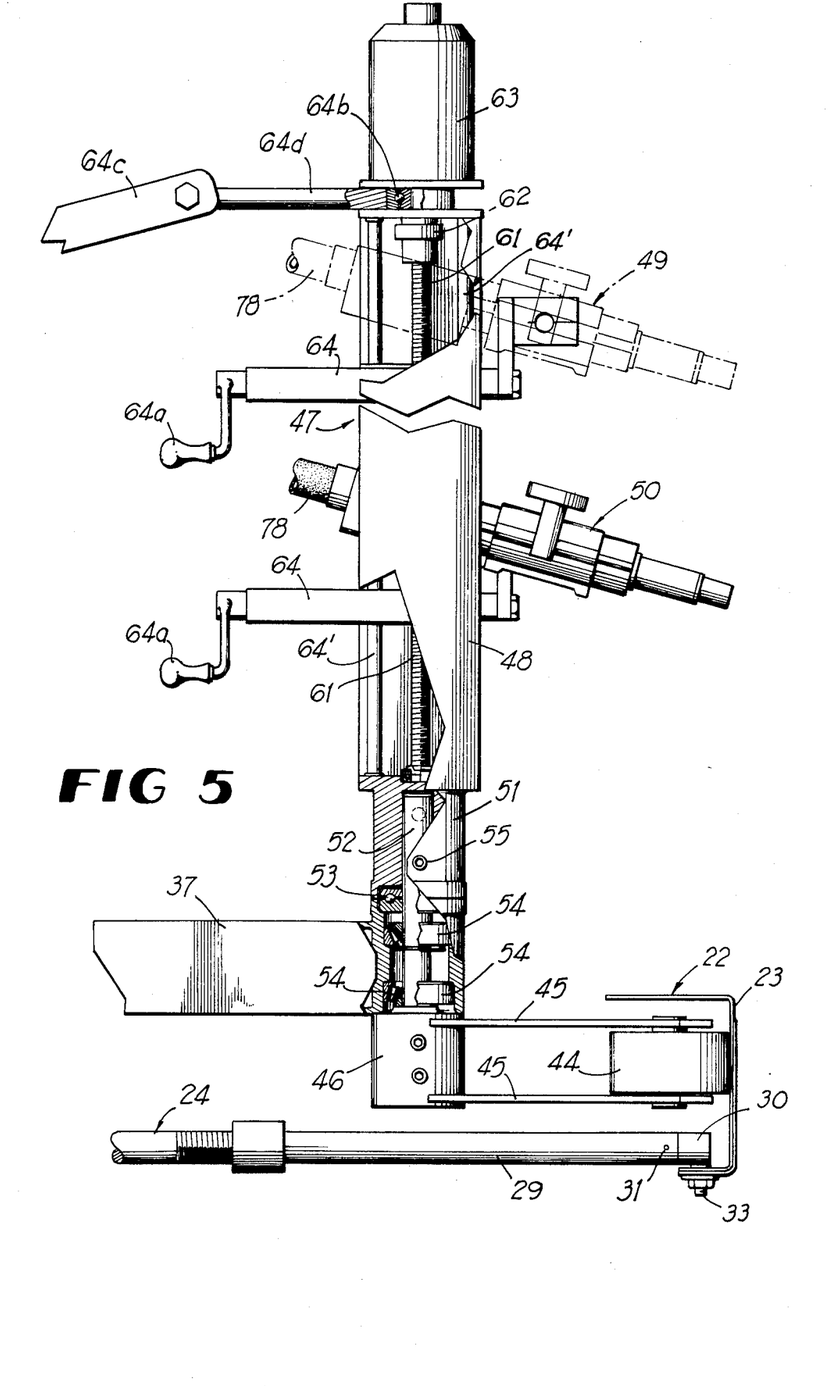
FIG. 5 is an enlarged side elevation, partly in vertical section, showing a welding nozzle positioning assembly and associated elements.

A bearing 64b, FIG. 5, is disposed between the top of housing 48 and the motor 63 to provide a stand-off space, as shown. An inclined brace 64c has its upper end connected by a swivel link 64d with the bearing 64b and its lower end connected to the upright 66. This brace provides rigidity to the assembly 47 while allowing that assembly to rotate around its vertical axis under control of the guide wheels 44 to maintain proper welding nozzle alignment with the wall being repaired.

Mounted on the rearward end of carriage arm 37 is a wire feed assembly 65 comprising the aforementioned upright 66, mounting near its top two spool holders 67 and two wire coil holders 68. Electric drive motors 69 for dual welding wire drive assemblies 70 are mounted on a horizontal platform extension 71 of upright 66. The upright 66 preferably has a diagonal brace 72.

Each wire drive assembly 70, as shown, includes a wire input guide 73 and a wire output guide 74, intervened by wire drive rolls 75. The output guides 74 can be replaced by any of a variety of gun adapters in order to conform to the particular type of welding gun selected for utilization on the machine. An adjustable tension spring 76 regulates tension on the upper drive rolls 75 through a pivoted idler arm 77. The two welding wires fed by the drive assemblies 70 pass through guide tubes 78 leading to the gun or nozzle units 49 and 50. An elevated guide tube 79 for the tubes 78 has an eye 80 receiving the tubes and constraining them. The guide 79 is fixed on the carriage arm 37.

An important feature of the machine is its ability to maintain a constant speed of movement for the nozzle units 49 and 50 across the digester wall, regardless of the varying degrees of extension or retraction of the carriage arm 37 in response to the coordinated operation of pneumatic cylinder 40 and guide wheels 44. This constant speed is achieved by attaching a gear rack 81, FIG. 6, to the carriage arm 37 for movement therewith. The teeth of this rack mesh with and drive a pinion gear 82 on the shaft of a potentiometer 83. By this means, the resistance of the potentiometer is adjusted to control the speed of drive motor 56 so as to maintain constant speed of movement of nozzle units 49 and 50 relative to the digester side wall at varying radii from the center of the table assembly 13, caused by linear movements of the carriage arm 37 during its traverse of the guide 23 or side wall of the digester.

As the carriage arm 37 is extended further from its rotational center 11, its speed of rotation caused by the drive motor 56 is decreased. Conversely, as the carriage arm 37 is retracted, its rotational speed increases. Thus, the machine compensates automatically for the ever-changing effective length of the carriage arm 37 during machine operation.

The horizontal rotational sweep of the carriage arm 37 is controlled by a pair of fixed limit stops 84, FIG. 6, on the table plate 20 which engage and trip actuators 85 of limit switches 86 secured to the rear of carriage arm box 35.

Figure 11:
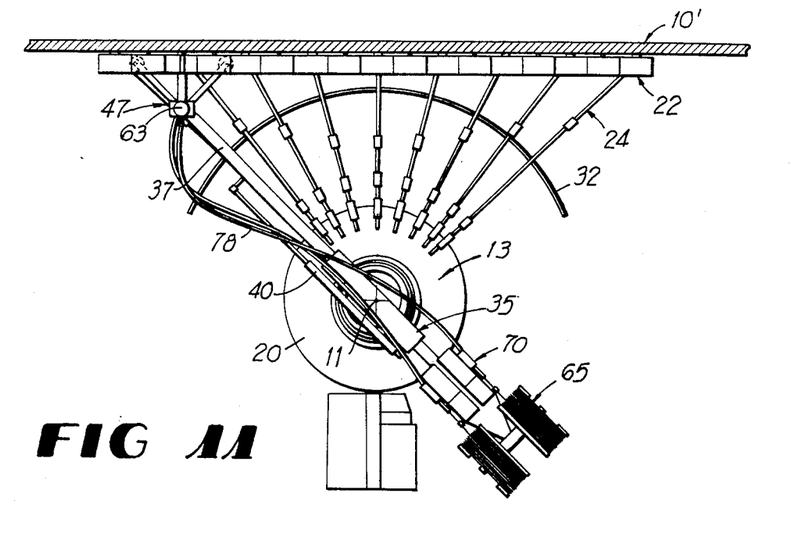
FIG. 11 is a plan view of the machine depicting its use in conjunction with a flat wall structure.
Figure 12:
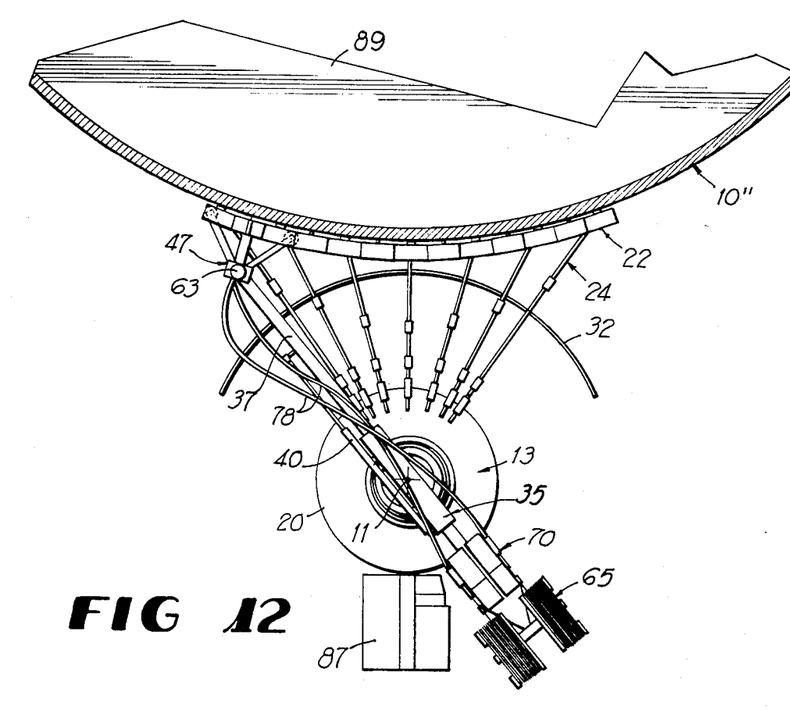
FIG. 12 is a further plan view of the machine depicting its use on the exterior of a cylindrical wall.

The electric and pneumatic controls for the machine are state-of-the-art and therefore need not be described in detail. The conventional controls are in a main control box 87 dependingly secured to the table assembly 13 and in a portable control pendant 88, FIG. 1. The machine embodying the invention rests on a level movable platform 89, customarily supported by cables and being motorized for locating the machine at various heights within the digester. Other types of platforms can be erected inside or outside of the digester or adjacent to other types of curved or flat vertical walls being serviced by the machine. In this latter connection, FIG. 11 shows the ability of the machine to act on a flat vertical wall 10', while FIG. 12 shows its ability to act on the exterior of a curved vertical wall.

Only one air carbon arc gouging torch can be utilized in the machine. It can be attached to either nozzle holding unit 49 or 50 in order to cover the entire range of movement. Two electric arc welding guns or nozzles can be held in the holding units 49 and 50. The gouging and welding operations are not performed on the vertical wall with vertical movements of the holding units 49 and 50 but only during horizontal movements of these units. The units 49 and 50 do not move vertically while traversing a wall horizontally. At the end of a horizontal traverse, the carriage arm 37 stops and the holding units 49 and 50 then move vertically to a new elevation, and then a horizontal traverse of the arm and holding units 49 and 50 resumes in the opposite direction.

When the machine is being operated for gouging, the wire spool holders 67 and wire coil holders 68 are removed from the upright 66. An electric interconnecting box and gouge system control box are then mounted on the upright 66. A gouge contactor box is mounted on the forward end of carriage arm 37 immediately forwardly of cable support 79. One automatic gouging torch is mounted on either of the adjusters 64.

A further feature is the ability to connect two hand-held semi-automatic weld guns to the wire drive assemblies 70 in order to perform semi-automatic welding for touch-up or repair work on vertical seams, etc.

Mounted on the platform extension 71 are two gas solenoids 90 which supply welding gases through the weld gun connectors to the guns, enabling gas metal arc welding, when desired.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A machine for reconditioning substantially vertical walls by gouging and/or welding operations comprising a table assembly adapted to be positioned and releasably locked in a use position relative to a substantially vertical wall, a substantially horizontal carriage arm assembly secured to the table assembly and being rotatable relative to the table assembly on a substantially vertical axis of rotation, rotational power means connected between the table assembly and carriage arm assembly, an upright weld metal depositing and/or gouging assembly mounted on and being bodily carried by the carriage arm assembly, means forming a vertical axis rotational connection between the carriage arm assembly and said upright weld metal depositing and/or gouging assembly, substantially horizontally projecting guide means on said last-named means and adapted to follow the horizontal profile of a substantially vertical wall undergoing reconditioning by the machine and to impart vertical axis rotation to said upright weld metal depositing and/or gouging assembly to maintain the latter in correct alignment with said wall, and yielding power means connected with the carriage arm assembly and biasing it in a linear horizontal direction to maintain said guide means in engagement with a surface to be followed by the guide means during operation of the machine.

2. A machine for reconditioning substantially vertical walls as defined in claim 1, and an adjustable contour substantially horizontal elongated guide device secured to the table assembly, and being engageable with a vertical wall undergoing reconditioning and being disposed radially outwardly of said guide means whereby the guide means can engage and follow the guide device during rotation of said substantially horizontal carriage arm assembly.

3. A machine for reconditioning substantially vertical walls as defined in claim 2, and said guide device being secured to the table assembly by plurality of adjustable length horizontal radiating support arms connected between the guide device and table assembly.

4. A machine for reconditioning substantially vertical walls as defined in claim 1, and said carriage arm assembly including an open-ended carriage arm tube secured to said rotational power means, a carriage arm extending through said tube and being movable therethrough longitudinally in opposite directions, and linear guide means for the carriage arm on said tube.

5. A machine for reconditioning substantially vertical walls as defined in claim 4, and the linear guide means comprising groups of guide rollers on and within the tube and engaging the exterior of the carriage arm.

6. A machine for reconditioning substantially vertical walls as defined in claim 5, and the tube and carriage arm being rectangular in cross section and in spaced coaxial relationship, the groups of guide rollers being adjustably secured to the tube near its opposite ends, and said groups of guide rollers including rollers which engage the four walls of the rectangular cross-section carriage arm.

7. A machine for reconditioning substantially vertical walls as defined in claim 1, and said rotational power means comprising a vertical axis bearing on said table assembly to which the carriage arm assembly is secured, a ring gear attached to a rotational part of said bearing, and a vertical axis drive motor for the carriage arm assembly on said table assembly and including a drive gear in engagement with said ring gear.

8. A machine for reconditioning substantially vertical walls as defined in claim 1, and said substantially horizontally projecting guide means including a pair of laterally spaced vertical axis guide wheels, and support arms carrying the guide wheels and being secured to said means forming a vertical axis rotational connection between the carriage arm assembly and said upright weld metal depositing and/or gouging assembly.

9. A machine for reconditioning substantially vertical walls as defined in claim 1, and said yielding power means comprising a fluid pressure operated power cylinder.

10. A machine for reconditioning substantially vertical walls as defined in claim 1, and said table assembly including a tripod base, and means to releasably lock the tripod base relative to a horizontal support surface.

11. A machine for reconditioning substantially vertical walls as defined in claim 1, and said upright weld metal depositing and/or gouging assembly comprising a housing connected with said means forming a vertical axis rotational connection, a power driven vertical axis screw shaft journaled within the housing, and a pair of vertically spaced weld gun or gouging torch supports and adjusters drivingly engaged with said screw shaft and being guided during vertical movement on said housing.

12. A machine for reconditioning substantially vertical walls as defined in claim 11, and vertical guide rod means on said housing and being engaged guidingly with said supports and adjusters.

13. A machine for reconditioning substantially vertical walls as defined in claim 1, and welding material supply and feed means on said carriage arm assembly near the rear end thereof, said upright weld metal depositing and/or gouging assembly being disposed near the forward end of the carriage arm assembly.

14. A machine for reconditioning substantially vertical walls as defined in claim 1, and a pair of spaced limit stops fixed on said table assembly, and a coacting pair of limit switches on the carriage arm assembly having actuator elements engaged by said limit stops during rotation of the carriage arm assembly.

15. A machine for reconditioning substantially vertical walls as defined in claim 1, and means on the carriage arm assembly responding to linear movements of the carriage arm of such assembly and regulating the speed of said rotational power means so as to maintain the speed of said upright weld metal depositing and/or gouging assembly constant with relation to the vertical wall undergoing reconditioning at varying radial positions of the carriage arm.

16. A machine for reconditioning substantially vertical walls as defined in claim 15, and said last-named means comprising a potentiometer on the carriage arm assembly having a rotational drive element, and a cooperating linear drive element on the carriage arm engaging and driving the rotational drive element.

17. A machine for selectively depositing weld metal on the vertical side wall of a paper pulp mill digester or for carbon arc gouging a surface of said side wall in preparation for welding, said machine comprising a table assembly adapted to be supported at a required elevation adjacent to said vertical side wall and adapted to be releasably locked in a use position relative to the side wall, an adjustable contour substantially horizontal elongated guide device adjustably connected with and supported by the table assembly and spaced substantially horizontally outwardly therefrom and being adapted to engage said side wall and conform substantially to the horizontal profile thereof, a substantially horizontal rotatable carriage arm assembly on the table assembly including forward end guide means engaging and following said guide device during rotation of the carriage arm assembly, means yieldingly biasing said forward end guide means into engagement with said guide device, and an upright weld metal depositing and/or gouging assembly on the carriage arm assembly.

18. A machine for selectively depositing weld metal on the vertical side wall of a paper pulp mill digester as defined in claim 17, and said upright weld metal depositing and/or gouging assembly being swiveled on the carriage arm assembly for self-adjusting rotational movement around a substantially vertical axis under control of said forward end guide means, and the forward end guide means also being swiveled on the carriage arm assembly and being connected with the upright weld metal depositing and/or gouging assembly.

19. A machine for selectively depositing weld metal on the vertical side wall of a paper pulp mill digester as defined in claim 18, and cooperative means on said table assembly and carriage arm assembly to maintain a constant speed of movement of the upright weld metal depositing and/or gouging assembly with the carriage arm assembly relative to the vertical side wall being reconditioned by the machine.

20. A machine for reconditioning a substantially vertical metal wall of a paper pulp mill digester or the like comprising a supporting base, an adjustable contour substantially horizontal guide device, adjustable means interconnecting said guide device and supporting base and supporting the guide device on said base and being operable to adjust the profile of the guide device, a substantially horizontal rotatable and longitudinally extensible and retractable carriage arm on the supporting base and having a forward end guide means engaging and following said guide device during rotation of the carriage arm around a substantially vertical axis of rotation, yielding means connected with and biasing the carriage arm and forward end guide means toward said guide device, and metal gouging and metal welding means mounted on the carriage arm and moving therewith relative to the vertical metal wall being reconditioned by the machine.

\* \* \* \* \*